Figure 2:
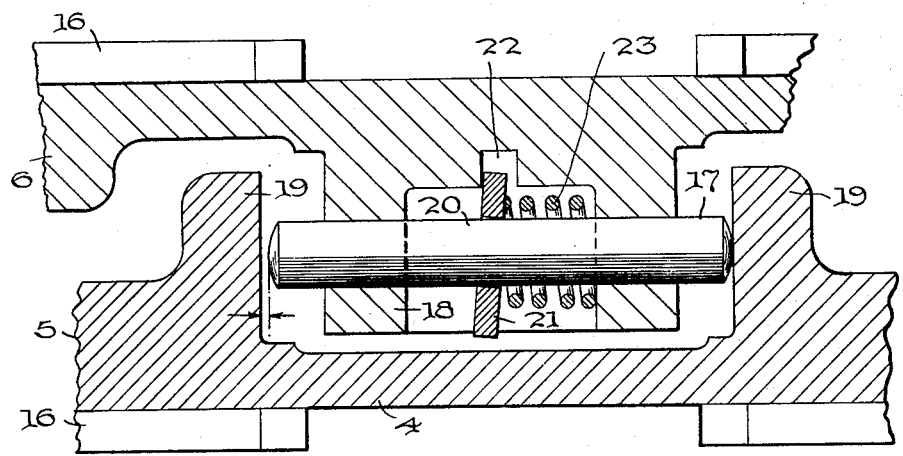

Aug. 19, 1952     M. B. LUCKER ET AL     2,607,442
SELF-ADJUSTING DISK BRAKE
Filed Sept. 19, 1949     2 SHEETS—SHEET 1
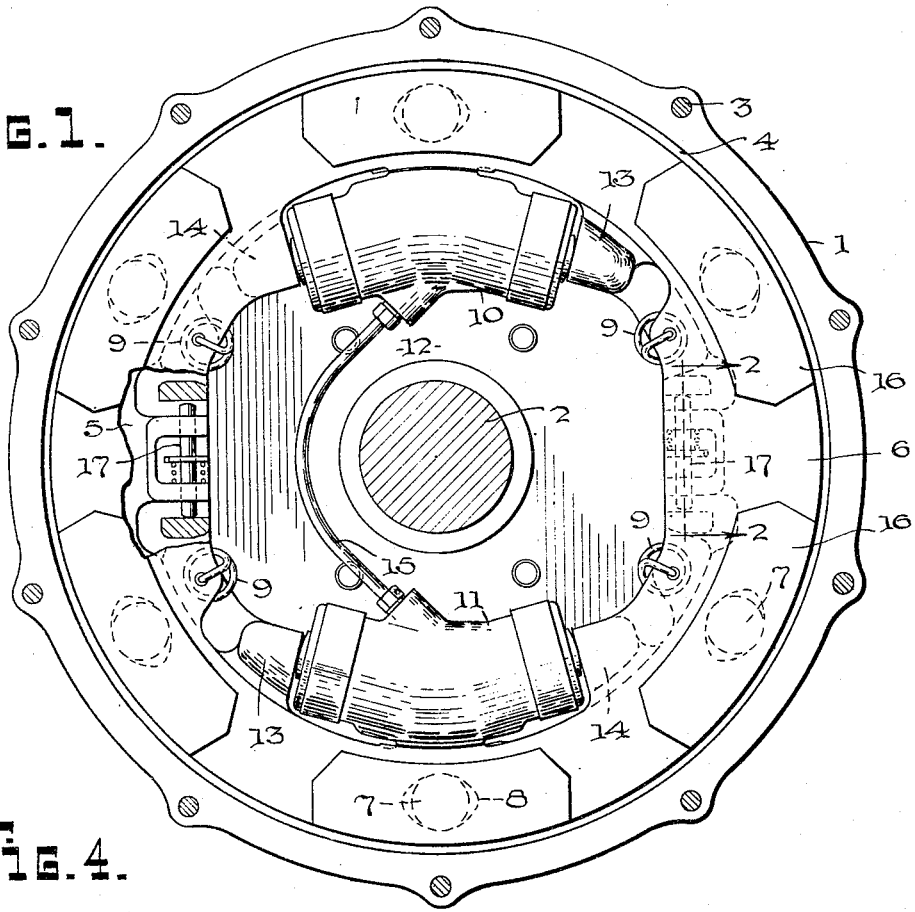
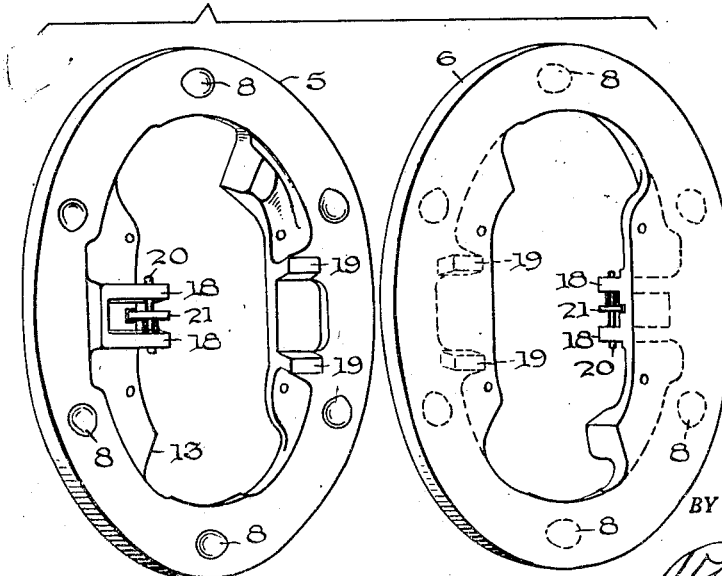
INVENTORS.
M. B. Lucker
BY C. R. Myers
L. F. Dasse
Robb & Robb
Attorneys.

Aug. 19, 1952 — M. B. LUCKER ET AL — 2,607,442
SELF-ADJUSTING DISK BRAKE
Filed Sept. 19, 1949 — 2 SHEETS—SHEET 2

INVENTORS.
M. B. Lucker
BY C. R. Myers
L. F. Dasse
Robb & Robb
Attorneys.

Patented Aug. 19, 1952

2,607,442

UNITED STATES PATENT OFFICE 2,607,442

SELF-ADJUSTING DISK BRAKE

Millard B. Lucker, St. Joseph, Claude R. Myers, Galien, and Lester F. Dasse, Sodus, Mich., assignors, by mesne assignments, to Lambert Brake Corporation, St. Joseph, Mich., a corporation of Michigan Application September 19, 1949, Serial No. 116,582

18 Claims. (Cl. 188—72)

The present invention relates to improvements in brakes for automotive vehicles and other purposes, and more especially to an improved self-adjusting disc brake having for some of its primary objectives simplification of construction and assembly, reduction in number of component parts, interchangeability of parts, simplification and ease of service or repair.

In its preferred embodiment, the invention more particularly concerns disc brakes of the type which comprises an outer rotatable casing or housing adapted to be connected to a vehicle wheel or other rotary member to be braked, for rotation therewith, said housing having axially spaced opposed friction surfaces, and a relatively stationary double-disc assembly coaxially arranged within said housing between the opposed friction surfaces of the latter for frictional engagement therewith upon energization of said brake, said inner double-disc assembly including camming means or balls disposed between said discs so that upon slight rotary movement of one disc relative to the other responsive to operation of a fluid-operated or other appropriate actuator, the camming means cause axial separation of the inner discs and consequent frictional engagement of the latter with the outer rotatable housing for producing a powerful and highly efficient braking action which is far superior to that attained by any other known type of brake.

While the wear of the friction surfaces of such brakes is substantially less than that of conventional drum-and-shoe brakes, some wear inevitably occurs in the course of time, thereby reducing the effectiveness of the brake, with attending lowering of the effective position of the usual brake pedal generally employed for controlling the operation of such brakes, or resulting in excessive movement of the brake pedal, until ultimately the floor board of the vehicle or other associated structure interferes with the pedal operation, thereby making the brake unsafe and a serious menace to life and property.

To obviate these difficulties, adjusting means may be provided to permit compensation for such wear, said adjusting means being either manually adjustable from time to time to maintain the proper spacing and running clearance of the friction surfaces, or being of the automatically operable type as more particularly disclosed in the prior co-pending application of Myers and Dasse, Serial No. 55,178, filed October 18, 1948, now Patent No. 2,526,149, dated October 17, 1950.

The present invention is principally concerned with automatic or self-adjusting brakes, and with adjusting means of the same general type as in the aforementioned application, but of improved form, by virtue of which the advantages and objectives mentioned at the commencement hereof, among others, are attained.

In carrying out the invention, a one-way locking clutch or adjuster is employed, which allows free relative rotation in one direction of the complementary discs of the inner double-disc assembly, sufficient to take up any wear and produce effective braking action on the outer rotary housing irrespective of the degree of wear of the friction surfaces, while positively limiting rotation of said discs in the opposite direction when the brake is released, so as to provide and maintain a substantially constant release or running clearance between the friction surfaces. According to the present invention, two one-way clutches or adjusters are preferably provided for each brake and are arranged diametrically opposite to each other, with the respective clutches or adjusters integrally built into the inner disc assembly, instead of being separately and individually fabricated and attached thereto as formerly disclosed in the application aforesaid.

More particularly, this invention contemplates the utilization of two identical inner discs with a plurality of camming means or balls disposed therebetween and seating in oppositely inclined sockets or seats formed in the opposed faces of the respective discs, said discs and balls being yieldably connected together as a unitary assembly, but with the discs permitted to move axially towards and away from each other responsive to slight rotation of one disc relative to the other, and each disc having a pair of relatively widely spaced lugs laterally extended from the inner face thereof towards the opposite disc, and a second pair of relatively closely spaced lugs extended laterally from the same face of the disc at a diametrically opposite position, so that when two identical discs are assembled together with the camming balls therebetween, the relatively closely spaced lugs of one disc will lie between the relatively widely spaced lugs of the other disc and will be spaced therefrom. Slidably extended through each pair of relatively closely spaced lugs on the respective discs is a rod or pin having its opposite ends fitting between the relatively widely spaced lugs of the other disc for abutting engagement with the latter lugs, said rod or pin being of a length slightly less than the distance between the relatively widely spaced lugs by an amount equal or proportionate to the running or release clearance between the friction surfaces of the brake. Coacting with each rod or pin is a one-way clutch member or locking device which permits free endwise or axial movement of the rod or pin in one direction to allow compensating relative rotation of the discs during brake application as wear of the friction surfaces occurs, while preventing movement of the rod or pin in the opposite direction when the brake is released, with consequent prevention of relative rotation of the discs in the opposite direction except to that extent which is predetermined by the difference between the length of the rod or pin and the spacing distance of the relatively widely spaced lugs between which the extreme opposite ends of the rod or pin lie.

The result of this adjuster arrangement is an automatic or self-adjustment of the brake to compensate for wear of the friction surfaces of the component brake members, and to maintain a constant running or release clearance of the brake throughout the complete life of the friction surfaces or the usual friction linings which constitute such friction surfaces.

A still further object of the invention is to provide an automatic adjuster of the aforementioned type, wherein the adjuster is so constructed and arranged as to limit the progressive adjustment which is automatically attainable thereby so as to prevent further self-adjustment of the brake before any damage to the brake occurs through excessive wear of the friction surfaces as would otherwise take place unless over-adjustment is prevented. This objective is preferably attained by the utilization of certain of the lugs on the respective discs as stop means or abutments to limit relative rotation of the discs of the inner double-disc assembly, thereby limiting slidable movement of the adjusting rod or pin in one direction.

Other and further objects and advantages of the invention will be hereinafter described and the novel features thereof defined in the appended claims.

Figure 3:
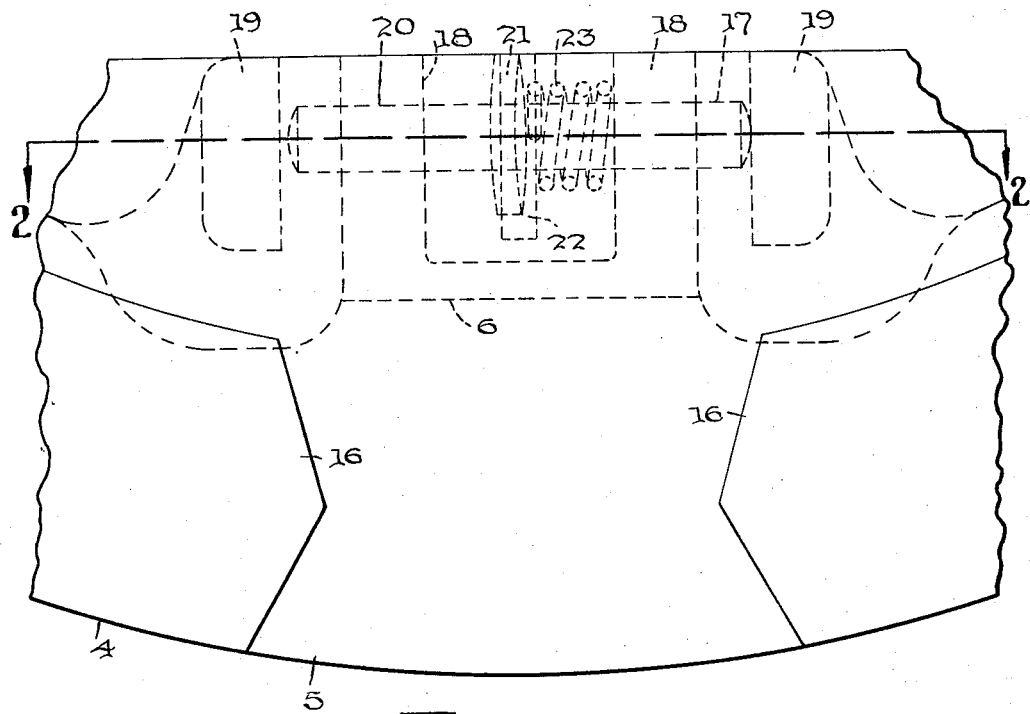

In the drawings:

Figure 1 is a view, partly in section and partly in elevation, showing a double-disc brake constructed in accordance with the present invention and as more particularly applicable to automotive vehicles, said brake embodying opposed sets of double-acting power cylinders or actuators for causing relative rotation between the discs of the inner double-disc assembly during braking applications, as required to energize the discs for frictional engagement with the outer rotatable housing or casing, one side of which housing is removed in this view so as to expose the interior of the brake assembly, and said brake also embodying opposed automatic adjusters of improved form according to the present invention;

Figure 2 is an enlarged fragmentary sectional view as taken on the line 2—2 of Figure 1 through the inner double-disc assembly and one of the adjusters, this view also representing a section on the line 2—2 of Figure 3;

Figure 3 is an enlarged fragmentary view in side elevation of that portion of the brake shown in Figure 2; and Figure 4 is an exploded perspective view of the two discs of the inner double-disc assembly, showing the relation of the lugs and the adjusters on the respective discs which are identical with each other, when the discs are relatively reversed and arranged in opposed relation to each other as in the brake assembly, the friction linings on the discs being omitted from this view.

Like reference characters designate corresponding parts in the several figures of the drawings, from which it will be understood that although the brake construction is represented in a form which is more particularly applicable to automotive vehicles, it is not confined thereto.

Referring first to Figure 1, 1 generally denotes the inboard section of a two-part housing or casing which is adapted to be attached to the wheel mounting hub of the vehicle wheel for rotation with the wheel in the usual manner of brakes of this type. The wheel, which is not shown, together with the brake housing or casing is mounted on an axle or spindle 2, and the two housing sections are suitably fastened or bolted together by bolts 3 extended through the abutting marginal flanges of the housing sections. When assembled, the housing defines within the same two axially spaced and opposed friction surfaces of annular form for cooperation with an inner double-disc assembly generally indicated at 4, the latter consisting of two discs respectively designated 5 and 6, as indicated in Figure 4, arranged back-to-back, with a plurality of balls 7 disposed therebetween and seating in oppositely inclined sockets or seats 8 formed in the inner opposed faces of the discs. A plurality of tension springs 9 connect the two discs 5 and 6 together, with the balls 7 held therebetween and forming a unitary assembly, with the two discs free to rotate relative to each other, as well as free to move axially towards and away from each other to spread the discs apart and into engagement with the frictional surfaces within the housing 1 during brake applications, or to release the discs from engagement with the housing 1 during release of the brake. The action of brakes of this type is now well known and has been more particularly described and illustrated in earlier applications, some of which are co-pending herewith, and hence it will be unnecessary to further enlarge upon the construction and operation referred to in the foregoing, except to say that two opposed actuators, generally designated 10 and 11 respectively, are employed to control energization and release of the brake, these actuators being suitably fixed and held stationary by a stationary backing plate or adapter plate designated 12 which may be fixedly attached to the wheel mounting at the inboard side of the brake.

The actuators 10 and 11 are preferably of the fluid-operated type and in the illustrative embodiment represented in the drawings, have the form of double-acting cylinders from which are extended fluid-operated pistons at each end of each cylinder, said pistons engaging diametrically opposed lugs or bosses 13, 13 on one of the inner discs, and a corresponding pair of diametrically opposed bosses 14, 14 on the other disc. Thus the inner disc assembly is supported upon the outer ends of the pistons of the respective actuators 10, 11 and freely float coaxially within the rotary housing 1, with the inner disc assembly remaining relatively stationary while the housing 1 rotates with the wheel of the vehicle. On admission of pressure fluid into the actuators 10 and 11, which are interconnected by a connecting pipe or tube 15, the pistons in each cylinder cause relative rotative movement of the two discs 5, 6 of the inner disc assembly 4, with resulting axial separation of the discs by the camming action of the balls 7 which climb the inclined ramps of the seats 8 between which the balls are positioned, thereby forcing the inner discs against the rotary housing 1 with a powerful braking effect which is accelerated by the motion of the vehicle in the manner of what is commonly known as a servo action. On release of the brake, the operation of which is usually controlled by a foot pedal (not shown) serving to actuate a master cylinder (not shown) which is connected to the actuators 10 and 11, the tension springs 9 cause the discs 5 and 6 of the inner disc assembly 4 to move axially towards each other pursuant to relative rotation between these discs in the opposite direction to their movement during brake application, with consequent rolling of the balls 7 down the ramps and towards the deepest part of the seats 8, and during this brake releasing action, the pistons in the fluid-operated actuators 10 and 11 are forced inwardly and the operating fluid is returned to the master cylinder. When the brake has been released, the discs 5 and 6 will disengage the rotary housing 1 and remain out of engagement therewith until the brake is reapplied.

As is customary in these brakes, the outer faces of the respective discs 5 and 6 are preferably provided with segments or other suitable facings of friction lining material, as indicated at 16, this lining being bonded or otherwise suitably attached to the discs in opposed relation to the friction surfaces of the housing 1. While these linings 16 are capable of withstanding considerable wear, they will inevitably wear out through constant or prolonged use. As the wear progressively occurs, the effective position of the brake operating pedal will progressively get lower and lower resulting in what is known as loss of pedal, with consequent excessive brake pedal being required to apply the brakes.

In order to obviate and overcome this difficulty, it is desirable to provide each brake with some suitable adjusting means, preferably of the automatic type, which will compensate for wear of the friction surfaces, and maintain a substantially constant release or running clearance between the friction surfaces during release of the brake, with consequent maintenance of a uniform or constant "high pedal" and uniformity of braking action on each brake application. While such self-adjusting or wear compensating means are not wholly new, the present invention more particularly concerns an improved adjusting means for disc brakes of the double-disc type, and said adjusting means will be now described.

As shown in Figure 1, two separate adjusting devices generally designated 17 are employed in each brake assembly, said devices being located at diametrically opposite sides of the brake assembly, and midway between the actuators 10 and 11. Each adjuster device comprises a pair of relatively closely spaced lugs 18, 18 which are laterally extended from one face of the disc and formed integrally with the disc, while the opposite disc is provided with a corresponding pair of laterally extended lugs 19, 19 which are relatively widely spaced apart so as to overlap over the lugs 18, 18 when the discs are assembled back-to-back as more particularly illustrated in Figure 2. When so overlapped, and in the original or new condition of the brake, before the friction linings 16 have become worn, the lugs 19, 19 are spaced from the lugs 18, 18 by an amount equal or proportionate to the maximum allowable wear which is to be compensated for before excessive wear of the linings 16 occurs to that extent which would damage the brake.

Slidably mounted in and extending completely through the spaced lugs 18, 18 is an adjuster rod or pin 20, the overall length of which is slightly less than the distance between the lugs 19, 19, by an amount equal or proportionate to the release or running clearance of the friction surfaces of the brake, as indicated by the arrows in Figure 2. Loosely encircling the rod or pin 20 is a washer 21 having its edge next to the adjacent face of the disc seated in a recess 22 between the lugs 18, 18 so that the washer 21 will always be held against any substantial axial movement relative to the rod or pin 20. A coil spring 23 loosely encircles the rod or pin 20, with one end of the spring seating against the washer 21, and the other end of the spring seating against one of the lugs 18, so that the washer is normally urged to a tilted or canted position as clearly shown in Figure 2. With the washer canted in the position shown in this figure, the rod or pin 20 is free to move endwise or axially to the right, while it is securely locked or gripped against movement in the opposite direction or to the left as viewed in Figure 2, the movement to the right being permitted by the yielding action of the spring 23 which allows the washer 21 to move slightly to a more perpendicular position with respect to the axis of the rod or pin 20 on application of force or pressure against the lefthand end of the rod or pin. As soon as this force or pressure is relieved, however, the spring 23 will cause the washer 21 to cant or tilt again into locking or gripping engagement with the rod or pin, thereby firmly holding the rod or pin against movement in response to any force or pressure applied to the extreme righthand end of the rod or pin. Thus, the washer 21 acts as a one-way clutch or gripping member.

The adjuster device just described and shown in detail in Figure 2 is duplicated at the diametrically opposite side of the brake, and the construction and operation of the device is precisely the same except that the narrowly spaced lugs 18, 18 are formed on the opposite disc, and the widely spaced lugs 19, 19 are formed on the first disc, as will hereinafter be more fully referred to.

In the operation of the brake as previously noted, and still referring to Figure 2 of the drawings, the inboard disc 5 is held against rotation during application of the brake, while the disc 6 is caused to rotate slightly so as to move to the left as viewed in Figure 2, in response to the actuators 10 and 11 which are controlled by the master cylinder of the hydraulic system. This relative movement of the two discs 5 and 6, rotatively, causes the balls 7 to cam the two discs apart, with consequent engagement of the friction linings 16 with the friction surfaces of the rotary housing 1 in which the inner disc assembly is mounted. As the friction linings 16 wear down, the lefthand end of the pin or rod 20, as viewed in Figure 2, will engage the adjacent lug 19 and move the rod or pin 20 to the right by an amount proportionate to the wear of the lining material, but on release of the brake, with consequent reversal of the relative rotation of the discs 5 and 6, the rod or pin 20 is held or locked by the canting of the washer 21 so that the righthand end of the pin will remain in abutting engagement with the adjacent lug 19 on the disc 5 and limit any further relative rotation or axial movement of the discs towards each other except to that extent permitted by the clearance indicated by the arrows in Figure 2. As the wear of the linings 16 progressively occurs, the adjuster rod or pin 20 will automatically displace itself endwise until ultimately one of the lugs 19 engages the adjacent lug 18 and prevents any further adjustment or take-up of the wear. This maximum limit of adjustment will be recognized by loss of pedal or excessive motion of the brake pedal, which signifies that the linings 16 should be replaced before any damage to the brake itself occurs.

It will be recognized from the foregoing that the principle of the adjuster described in the foregoing and shown in the accompanying drawings is substantially the same as that of the adjusters disclosed in the co-pending application of Myers and Dasse hereinbefore referred to, but the construction is simpler in the case of the present invention, more economical to manufacture, easier and simpler to adjust or assemble, and the component parts of the adjuster are reduced in number, particularly in view of the fact that the lugs 18, 18 and 19, 19 are formed as integral parts of the discs 5 and 6. Moreover, the adjuster is located and wholly confined between the discs of the inner double-disc assembly, and are therefore out-of-the-way and fully protected against damage at all times.

While a single adjuster 17 may be employed with satisfactory results, I preferably provide two adjusters arranged at diametrically opposed positions about the brake assembly, as previously mentioned, which has the advantage of simplification of the construction by the use of two discs which are identical for the inner double-disc assembly, as more particularly illustrated in Figure 4. As will be seen from this figure, the disc 5 is provided on the inner face thereof with one pair of relatively closely spaced lugs 18, 18 in which the adjuster pin or rod 20 is slidably mounted, while at the diametrically opposite position on the same face of this disc, a pair of relatively widely spaced lugs 19, 19 are provided, all of these lugs being preferably integral with the disc and being laterally extended from the same side of the disc as that in which the ball seats or sockets 8 are formed. When two such identical discs are disposed in back-to-back relation to each other, as shown in Figure 4, the relatively widely spaced lugs 19, 19 on the respective discs will overlie the relatively closely spaced lugs 18, 18, with the latter lugs lying between the lugs 19, 19, and with the respective adjuster rods or pins 20 disposed between the respective pairs of widely spaced lugs 19, 19, so that the parts assume the positions shown in Figures 1 and 2 when the two identical discs are fully assembled, with the balls 7 seated in the seats or sockets 8 and held between the discs by the tension springs 9 which normally urge the two discs towards each other. It will be recognized from Figure 4 that the disc 6 is identical with the disc 5, but the disc 6 is reversed or inverted preparatory to assembling the two discs together with the balls 7 therebetween.

While the specific details have been herein shown and described, the invention is not confined thereto as changes and alterations may be made without departing from the spirit thereof as defined in the appended claims.

We claim:

1. A friction device, comprising a plurality of disc-like members, said disc-like members being shiftable both angularly and axially relative to each other, and automatic self-adjuster means carried by said disc-like members for adjusting the position of said disc-like members relative to each other, said adjuster means comprising an adjuster member wholly supported by one of said disc-like members and freely shiftable endwise in one direction, one-way locking means coacting with said shiftable adjuster member for permitting such shifting movement in one direction, while prohibiting movement of said adjuster member in the opposite direction, and spaced abutment means carried by the other disc-like member and extended therefrom across the extreme opposite ends of said adjuster member for abutting engagement therewith.

2. A friction brake, comprising a rotatable member having opposed axially spaced friction surfaces, a relatively stationary double-disc assembly coaxially arranged between the opposed friction surfaces of the rotary member aforesaid for frictional engagement therewith, said double-disc assembly including camming means between said discs for causing engagement of said discs with the friction surfaces of said rotary member responsive to slight rotative movement of one disc relative to the other, actuator means for effecting rotative movement of one disc relative to the other, and adjuster means disposed between and in opposed relation to the respective disc bodies of said discs for automatically adjusting said discs relative to the friction surfaces of said rotary member responsive to braking applications to compensate for wear and for maintaining a substantially constant release clearance of said discs relative to said rotary member when the brake is released, said adjuster means comprising an adjuster rod wholly supported by one disc of said double-disc assembly and freely shiftable endwise in one direction, one-way locking means coacting with said rod for permitting such shifting movement thereof in one direction, while prohibiting movement of said rod in the opposite direction, and spaced abutment means carried by the other disc of said double-disc assembly and laterally extended therefrom across the extreme opposite ends of said rod for abutting engagement therewith.

3. A friction brake, comprising a rotatable member having opposed axially spaced friction surfaces, a relatively stationary double-disc assembly coaxially arranged between the opposed friction surfaces of the rotary member aforesaid for frictional engagement therewith, said double-disc assembly including camming means between said discs for causing engagement of said discs with the friction surfaces of said rotary member responsive to slight rotative movement of one disc relative to the other, actuator means for effecting rotative movement of one disc relative to the other, and adjuster means disposed between and in opposed relation to the respective disc bodies of said discs for automatically adjusting said discs relative to the friction surfaces of said rotary member responsive to braking applications to compensate for wear and for maintaining a substantially constant release clearance of said discs relative to said rotary member when the brake is released, said adjuster means comprising an adjuster rod wholly supported by one disc of said double-disc assembly and freely shiftable endwise in one direction, one-way locking means coacting with said rod for permitting such shifting movement thereof in one direction, while prohibiting movement of said rod in the opposite direction, and spaced abutment means carried by the other disc of said double-disc assembly and laterally extended therefrom across the extreme opposite ends of said rod for abutting engagement therewith, the distance between said spaced abutment means being slightly greater than the overall length of said rod.

4. A friction brake, comprising a rotatable member having opposed axially spaced friction surfaces, a relatively stationary double-disc assembly coaxially arranged between the opposed friction surfaces of the rotary member aforesaid for frictional engagement therewith, said double-disc assembly including camming means between said discs for causing engagement of said discs with the friction surfaces of said rotary member responsive to slight rotative movement of one disc relative to the other, actuator means for effecting rotative movement of one disc relative to the other, and adjuster means disposed between and in opposed relation to the respective disc bodies of said discs for automatically adjusting said discs relative to the friction surfaces of said rotary member responsive to braking applications to compensate for wear and for maintaining a substantially constant release clearance of said discs relative to said rotary member when the brake is released, said adjuster means comprising an adjuster rod wholly supported by one disc of said double-disc assembly and freely shiftable endwise in one direction, one-way locking means coacting with said rod for permitting such shifting movement thereof in one direction, while prohibiting movement of said rod in the opposite direction, and spaced abutment means carried by the other disc of said double-disc assembly and laterally extended therefrom across the extreme opposite ends of said rod for abutting engagement therewith, the distance between said spaced abutment means being slightly greater than the overall length of said rod by an amount proportionate to the release clearance of said brake.

5. A friction brake, comprising a rotatable member having opposed axially spaced friction surfaces, a relatively stationary double-disc assembly coaxially arranged between the opposed friction surfaces of the rotary member aforesaid for frictional engagement therewith, said double-disc assembly including camming means between said discs for causing engagement of said discs with the friction surfaces of said rotary member responsive to slight rotative movement of one disc relative to the other, actuator means for effecting rotative movement of one disc relative to the other, and adjuster means disposed between and in opposed relation to the respective disc bodies of said discs for automatically adjusting said discs relative to the friction surfaces of said rotary member responsive to braking applications to compensate for wear and for maintaining a substantially constant release clearance of said discs relative to said rotary member when the brake is released, said adjuster means comprising an adjuster rod slidably mounted in a pair of spaced lugs carried by one disc of said double-disc assembly and laterally extended therefrom toward the other disc, with said rod wholly supported thereby, said rod being freely shiftable endwise in one direction, one-way locking means coacting with said rod for permitting such shifting movement thereof in one direction, while prohibiting movement of said rod in the opposite direction, and a pair of spaced lugs carried by the other disc of said double-disc assembly and laterally extended therefrom towards the first-mentioned disc at the extreme opposite ends of said rod for abutting engagement with the ends of said rod.

6. A friction brake, comprising a rotatable member having opposed axially spaced friction surfaces, a relatively stationary double-disc assembly coaxially arranged between the opposed friction surfaces of the rotary member aforesaid for frictional engagement therewith, said double-disc assembly including camming means between said discs for causing engagement of said discs with the friction surfaces of said rotary member responsive to slight rotative movement of one disc relative to the other, actuator means for effecting rotative movement of one disc relative to the other, and adjuster means disposed between and in opposed relation to the respective disc bodies of said discs for automatically adjusting said discs relative to the friction surfaces of said rotary member responsive to braking applications to compensate for wear and for maintaining a substantially constant release clearance of said discs relative to said rotary member when the brake is released, said adjuster means comprising an adjuster rod slidably mounted in a pair of spaced lugs carried by one disc of said double-disc assembly and laterally extended therefrom toward the other disc, with said rod wholly supported thereby, said rod being freely shiftable endwise in one direction, one-way locking means coacting with said rod for permitting such shifting movement thereof in one direction, while prohibiting movement of said rod in the opposite direction, and a pair of spaced lugs carried by the other disc of said double-disc assembly and laterally extended therefrom towards the first-mentioned disc at the extreme opposite ends of said rod for abutting engagement with the ends of said rod, said spaced lugs aforesaid being formed as an integral part of the respective discs.

7. A friction brake, comprising a rotatable member having opposed axially spaced friction surfaces, a relatively stationary double-disc assembly coaxially arranged between the opposed friction surfaces of the rotary member aforesaid for frictional engagement therewith, said double-disc assembly including camming means between said discs for causing engagement of said discs with the friction surfaces of said rotary member responsive to slight rotative movement of one disc relative to the other, actuator means for effecting rotative movement of one disc relative to the other, and adjuster means disposed between and in opposed relation to the respective disc bodies of said discs for automatically adjusting said discs relative to the friction surfaces of said rotary member responsive to braking applications to compensate for wear and for maintaining a substantially constant release clearance of said discs relative to said rotary member when the brake is released, said adjuster means comprising an adjuster rod wholly supported by one disc of said double-disc assembly and freely shiftable endwise in one direction, one-way locking means coacting with said rod for permitting such shifting movement thereof in one direction, while prohibiting movement of said rod in the opposite direction, and spaced abutment means carried by the other disc of said double-disc assembly and laterally extended therefrom across the extreme opposite ends of said rod for abutting engagement therewith, said one-way locking means comprising a washer loosely embracing said rod and supported thereby, and means coacting with said washer for normally canting the same in such direction relative to the axis of said rod as to grip and restrain said rod against endwise movement in one direction, while permitting endwise movement of said rod through said washer in the opposite direction.

8. A friction brake, comprising a rotatable member having opposed axially spaced friction surfaces, a relatively stationary double-disc assembly coaxially arranged between the opposed friction surfaces of the rotary member aforesaid for frictional engagement therewith, said double-disc assembly including camming means between said discs for causing engagement of said discs with the friction surfaces of said rotary member responsive to slight rotative movement of one disc relative to the other, actuator means for effecting rotative movement of one disc relative to the other, and adjuster means disposed between and in opposed relation to the respective disc bodies of said discs for automatically adjusting said discs relative to the friction surfaces of said rotary member responsive to braking applications to compensate for wear and for maintaining a substantially constant release clearance of said discs relative to said rotary member when the brake is released, each disc of said double-disc assembly being provided with a pair of circumferentially spaced lugs laterally extended from one face thereof in relatively widely spaced relation to each other, and with a second pair of circumferentially spaced lugs laterally extended from the same face of the disc in relatively closely spaced relation to each other and disposed in a position diametrically opposite to the first-mentioned pair of lugs, said discs being assembled back-to-back with the lugs on one disc opposed to the lugs on the other disc and the closely spaced lugs of one disc lying between the widely spaced lugs of the other disc and spaced therefrom, and said adjuster means including an elongated rigid member slidably mounted in each pair of closely spaced lugs and freely shiftable endwise in one direction between the adjacent widely spaced lugs on the other disc, and one-way locking means coacting with each slidable member for permitting such shifting movement thereof in one direction, while prohibiting shifting movement thereof in the opposite direction.

9. A friction brake, comprising a rotatable member having opposed axially spaced friction surfaces, a relatively stationary double-disc assembly coaxially arranged between the opposed friction surfaces of the rotary member aforesaid for frictional engagement therewith, said double-disc assembly including camming means between said discs for causing engagement of said discs with the friction surfaces of said rotary member responsive to slight rotative movement of one disc relative to the other, actuator means for effecting rotative movement of one disc relative to the other, and adjuster means disposed between and in opposed relation to the respective disc bodies of said discs for automatically adjusting said discs relative to the friction surfaces of said rotary member responsive to braking applications to compensate for wear and for maintaining a substantially constant release clearance of said discs relative to said rotary member when the brake is released, each disc of said double-disc assembly being provided with a pair of circumferentially spaced lugs laterally extended from one face thereof in relatively widely spaced relation to each other, and with a second pair of circumferentially spaced lugs laterally extended from the same face of the disc in relatively closely spaced relation to each other and disposed in a position diametrically opposite to the first-mentioned pair of lugs, said discs being assembled back-to-back with the lugs on one disc opposed to the lugs on the other disc and the closely spaced lugs of one disc lying between the widely spaced lugs of the other disc and spaced therefrom, and said adjuster means including an elongated rigid member slidably mounted in each pair of closely spaced lugs and freely shiftable endwise in one direction between the adjacent widely spaced lugs on the other disc, and one-way locking means coacting with each slidable member for permitting such shifting movement thereof in one direction, while prohibiting shifting movement thereof in the opposite direction, and the length of said shiftable members being slightly less than the distance between the widely spaced lugs.

10. A friction unit for brakes and the like, comprising a pair of coaxial discs movable both rotatively and axially relative to each other, camming means between said discs for axially separating said discs apart responsive to slight rotation of one disc relative to the other, yieldable means interconnecting said discs for normally urging the same towards each other, said discs being identical with each other and each disc being provided with a pair of circumferentially spaced lugs laterally extended from one face thereof in relatively widely spaced relation to each other, and provided with a second pair of circumferentially spaced lugs laterally extended from the same face of the disc in relatively closely spaced relation to each other and disposed in a position diametrically opposite to the first-mentioned pair of lugs, so that when said discs are assembled back-to-back, with the lugs on one disc opposed to the lugs on the other disc, the closely spaced lugs of one disc will lie between the widely spaced lugs of the other disc and spaced therefrom, an elongated rigid member slidably mounted in each pair of closely spaced lugs and freely shiftable endwise therein in one direction, with the extreme ends of said member lying between the adjacent widely spaced lugs on the other disc for abutting engagement therewith, and one-way locking means coacting with each slidable member for permitting such shifting movement thereof in one direction responsive to rotative movement of one disc relative to the other in a direction causing the camming means to axially move the discs apart, while prohibiting shifting movement of said slidable member in the opposite direction.

11. A friction device as defined in claim 10, wherein said one-way locking means comprises a canted washer mounted on each slidable member.

12. A friction device as defined in claim 10, wherein said one-way locking means comprises a canted washer mounted on each slidable member between the closely spaced lugs in which the slidable member is mounted.

13. A friction device as defined in claim 10, wherein said one-way locking means comprises a canted washer mounted on each slidable member between the closely spaced lugs in which the slidable member is mounted, with one edge of said washer recessed in the contiguous face of the disc.

14. A friction device as defined in claim 10, wherein said one-way locking means comprises a canted washer mounted on each slidable member between the closely spaced lugs in which the slidable member is mounted, with one edge of said washer recessed in the contiguous face of the disc, and a coil spring encircling said slidable member with one of its ends seating against one of said closely spaced lugs and the other end of said spring seating against said washer to normally urge said washer into a canted position on said slidable member.

15. A friction device as defined in claim 10, wherein the overall length of each slidable member is slightly less than the distance between the adjacent widely spaced lugs on the other disc to allow slight relative rotation of said discs in the opposite direction, with consequent slight axial displacement of said discs towards each other.

16. A friction brake, comprising a rotatable member having opposed axially spaced friction surfaces, a relatively stationary double-disc assembly coaxially arranged between the opposed friction surfaces of the rotary member aforesaid for frictional engagement therewith, said double-disc assembly including camming means between said discs for causing engagement of said discs with the friction surfaces of said rotary member responsive to slight rotative movement of one disc relative to the other, actuator means for effecting rotative movement of one disc relative to the other, and adjuster means disposed between and in opposed relation to the respective disc bodies of said discs for automatically adjusting said discs relative to the friction surfaces of said rotary member responsive to braking applications to compensate for wear and for maintaining a substantially constant release clearance of said discs relative to said rotary member when the brake is released, said adjuster means including means for limiting adjustment of said discs relative to the friction surfaces of said rotary member when the wear of said friction surfaces attains a predetermined amount.

17. A friction brake, comprising a rotatable member having opposed axially spaced friction surfaces, a relatively stationary double-disc assembly coaxially arranged between the opposed friction surfaces of the rotary member aforesaid for frictional engagement therewith, said double-disc assembly including camming means between said discs for causing engagement of said discs with the friction surfaces of said rotary member responsive to slight rotative movement of one disc relative to the other, actuator means for effecting rotative movement of one disc relative to the other, and adjuster means disposed between and in opposed relation to the respective disc bodies of said discs for automatically adjusting said discs relative to the friction surfaces of said rotary member responsive to braking applications to compensate for wear and for maintaining a substantially constant release clearance of said discs relative to said rotary member when the brake is released, said adjuster means comprising an adjuster rod slidably mounted in a pair of spaced lugs carried by one disc of said double-disc assembly and laterally extended therefrom towards the other disc, with said rod wholly supported thereby, said rod being freely shiftable endwise in one direction, one-way locking means coacting with said rod for permitting such shifting movement thereof in one direction, while prohibiting movement of said rod in the opposite direction, and a pair of spaced lugs carried by the other disc of said double-disc assembly and laterally extended therefrom towards the first-mentioned disc at the extreme opposite ends of said rod for abutting engagement with the ends of said rod, one of said lugs on one disc being engageable with one of said lugs on the other disc to limit further adjustment of said discs relative to the friction surfaces of the rotary member when a predetermined amount of wear of said friction surfaces has occurred.

18. A friction unit as defined in claim 10, wherein one of the closely spaced lugs on one disc is engageable with one of the widely spaced lugs on the other disc to limit relative rotation of the discs.

MILLARD B. LUCKER.
CLAUDE R. MYERS.
LESTER F. DASSE.

REFERENCES CITED

The following references are of record in the file of this patent:

UNITED STATES PATENTS

| Number | Name | Date |
| --- | --- | --- |
| 2,278,144 | Milan | Mar. 31, 1942 |
| 2,291,662 | Thibeault | Aug. 4, 1942 |
| 2,526,149 | Myers et al. | Oct. 17, 1950 |

FOREIGN PATENTS

| Number | Country | Date |
| --- | --- | --- |
| 464,130 | Great Britain | Apr. 6, 1937 |
| 232,251 | Switzerland | May 15, 1944 |

OTHER REFERENCES

Automotive Industries, page 37, Sept. 15, 1949.